(12) United States Patent
Huang et al.

(10) Patent No.: US 12,534,955 B2
(45) Date of Patent: Jan. 27, 2026

(54) THERMOCHROMIC STRUCTURE FOR SOLAR AND THERMAL RADIATION REGULATION

(71) Applicant: The Hong Kong University of Science and Technology, Hong Kong (CN)

(72) Inventors: Baoling Huang, Hong Kong (CN); Shuhuai Yao, Hong Kong (CN); Chongjia Lin, Hong Kong (CN); Jun Hur, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 278 days.

(21) Appl. No.: 17/989,685

(22) Filed: Nov. 18, 2022

(65) Prior Publication Data

US 2023/0366265 A1    Nov. 16, 2023

Related U.S. Application Data

(60) Provisional application No. 63/282,668, filed on Nov. 23, 2021.

(51) Int. Cl.
*E06B 9/24* (2006.01)
*B32B 3/04* (2006.01)
(Continued)

(52) U.S. Cl.
CPC .................. *E06B 9/24* (2013.01); *B32B 3/04* (2013.01); *B32B 5/18* (2013.01); *B32B 15/02* (2013.01);
(Continued)

(58) Field of Classification Search
CPC ....... B32B 15/02; B32B 27/283; B32B 27/32; B32B 2266/122; B32B 2419/00; E06B 9/24; E06B 2009/2411; E06B 2009/2417
See application file for complete search history.

(56) References Cited

U.S. PATENT DOCUMENTS

2013/0128336 A1    5/2013    Dean et al.
2016/0376747 A1   12/2016    Wang et al.
(Continued)

FOREIGN PATENT DOCUMENTS

CN    102066993 A    5/2011
CN    112442204 A    3/2021
(Continued)

OTHER PUBLICATIONS

Hanauer et al., "Transparent and mechanically resistant silver-nanowire-based low-emissivity coatings"; doi:10.1021/acsami.1c02689 (Year: 2021).*

(Continued)

*Primary Examiner* — Mark Ruthkosky
*Assistant Examiner* — Rebecca L Grusby
(74) *Attorney, Agent, or Firm* — Idea Intellectual Limited; Sam T. Yip

(57) ABSTRACT

A solar and thermal regulating window structure including: an optically-transparent housing frame; a reversible liquid absorbent material layer positioned in the housing frame; a thermally-reflective layer having high solar transmittance and high thermal reflectance positioned over the liquid absorbent material layer; a liquid, being absorbed in the liquid absorbent material layer below a selected transition temperature, and being positioned over the liquid absorbent material layer above the selected transition temperature, such that when below the selected transition temperature, the window structure facilitates indoor solar heating through solar transmittance during daytime and facilitates indoor heat insulation through thermal reflectance during daytime and nighttime, when above the selected transition temperature, the window structure facilitates indoor heat dissipation through thermal emission; and an optical film with high transmittance for both solar and thermal radiation, config- (Continued)

ured to seal the liquid absorbent material layer, liquid, and thermally-reflective layer in the housing frame. The window structure enables passive all-day thermal management in different climates.

10 Claims, 8 Drawing Sheets

(51) Int. Cl.
  *B32B 5/18* (2006.01)
  *B32B 15/02* (2006.01)
  *B32B 27/06* (2006.01)
  *B32B 27/08* (2006.01)
  *B32B 27/28* (2006.01)
  *B32B 27/32* (2006.01)

(52) U.S. Cl.
  CPC ............ *B32B 27/065* (2013.01); *B32B 27/08* (2013.01); *B32B 27/283* (2013.01); *B32B 27/32* (2013.01); *B32B 2255/205* (2013.01); *B32B 2266/0257* (2013.01); *B32B 2266/122* (2016.11); *B32B 2307/30* (2013.01); *B32B 2307/412* (2013.01); *B32B 2419/00* (2013.01); *E06B 2009/2417* (2013.01)

(56) References Cited

U.S. PATENT DOCUMENTS

| | | | |
|---|---|---|---|
| 2018/0174976 A1 | 6/2018 | Bellan et al. | |
| 2019/0179176 A1* | 6/2019 | Hu | G02F 1/0147 |
| 2021/0373361 A1* | 12/2021 | Fang | E06B 9/24 |
| 2021/0382333 A1* | 12/2021 | Long | G02F 1/0147 |
| 2022/0290899 A1* | 9/2022 | Li | F24S 60/30 |

FOREIGN PATENT DOCUMENTS

| | | | | |
|---|---|---|---|---|
| CN | 113633627 A | 11/2021 | | |
| WO | 2016064565 A1 | 4/2016 | | |
| WO | WO-2016108759 A1 * | 7/2016 | ............... | E06B 7/28 |

OTHER PUBLICATIONS

Zhou, "Fabrication and solar modulation of thermochromic hydrogel for smart window application"; doi:10.32657/10220/47889 (Year: 2018).*

Wang et al., "Smart window based on temperature-responsive starch hydrogel with a dynamic regulation mode"; doi:10.1021/acs.iecr. 0c0402 (Year: 2020).*

Yujie Ke et al., "Smart Windows: Electro-, Thermo-, Mechano-, Photochromics, and Beyond," Advanced Energy Materials, 2019, pp. 1-38.

Mario Tarantini et al., "A life cycle approach to Green Public Procurement of building materials and elements: A case study on windows," Energy 36, 2011, pp. 2473-2482.

Linshuang Long et al., "How to be smart and energy efficient: A general discussion on thermochromic windows," Scientific Reports, 2014, pp. 1-10.

Hong Ye et al., "Theoretical discussions of perfect window, ideal near infrared solar spectrum regulating window and current thermochromic window," Energy and Buildings 49, 2012, pp. 164-172.

Ruben Baetens et al., "Properties, requirements and possibilities of smart windows for dynamic daylight and solar energy control in buildings: A state-of-the-art review," Solar Energy Materials & Solar Cells 94, 2010, pp. 87-105.

Yujie Ke et al., "Emerging Thermal-Responsive Materials and Integrated Techniques Targeting the Energy-Efficient Smart Window Application," Advanced Functional Materials, 2018, pp. 1-18.

S.M. Babulanam et al., "Thermochromic VO2 Films for Energy-Efficient Windows," Solar Energy Materials 16, 1987, pp. 347-363.

Yuanyuan Cui et al., "Thermochromic VO2 for Energy-Efficient Smart Windows," Joule 2, 2018, pp. 1-40.

Yujie Ke et al., "Adaptive Thermochromic Windows from Active Plasmonic Elastomers," Joule 3, 2019, pp. 858-871.

Hang Wei et al., "Smart Materials for Dynamic Thermal Radiation Regulation," Small, 2021, pp. 1-21.

Yang Zhou et al., "Hydrogel Smart Windows," Journal of Materials Chemistry A, 2020, pp. 1-49.

Yang Zhou et al., "Liquid Thermo-Responsive Smart Window Derived from Hydrogel" Joule 4, 2020, pp. 1-17.

Xin-Hao Li et al., "Broadband Light Management with Thermochromic Hydrogel Microparticles for Smart Windows," Joule 3, 2019, pp. 1-13.

Ding Cao et al., "Sunlight-Driven Photo-Thermochromic Smart Windows," Solar RRL, 2018, pp. 1-8.

Emile Haddad et al., "Large Tuneability IR Emittance Thermal Control Coating for Space Applications," 43rd International Conference on Environment Systems (ICES), 2013, pp. 1-7.

Ahmed M. Morsy et al., "Experimental demonstration of dynamic thermal regulation using vanadium dioxide thin films," Scientific Reports, 2020, pp. 1-10.

Zuqiang Xu et al., "Sunlight-Induced Photo-Thermochromic Supramolecular Nanocomposite Hydrogel Film for Energy-Saving Smart Window," Solar RRL, 2018, pp. 1-10.

Yang Zhou et al., "Temperature-responsive hydrogel with ultra-large solar modulation and high luminous transmission for "smart window" applications," Journal of Materials Chemistry A, 2014, pp. 13550-13555.

Yang Zhou et al., "Electro-Thermochromic Devices Composed of Self-Assembled Transparent Electrodes and Hydrogels," Advanced Materials Technologies, 2016, pp. 1-7.

Tao Li et al., "Achieving Better Greenhouse Effect than Glass: Visibly Transparent and Low Emissivity Metal-Polymer Hybrid Metamaterials," ES Energy & Environment, 2019, pp. 102-107.

Takeo Tomiyama et al., "Optical properties of silver nanowire/ polymer composite films: absorption, scattering, and color difference," Optical Materials Express, 2020, pp. 3202-3214.

Soroosh Daqiqeh Rezaei et al., "A review of conventional, advanced, and smart glazing technologies and materials for improving indoor environment," Solar Energy Materials & Solar Cells 159, 2017, pp. 26-51.

Notice of Allowance of the corresponding China patent application No. 202211451923.X mailed on Aug. 22, 2024.

First Office Action of the corresponding China patent application No. 202211451923.X mailed on Apr. 18, 2024.

* cited by examiner

THERMOCHROMIC STRUCTURE FOR SOLAR AND THERMAL RADIATION REGULATION

CROSS-REFERENCE TO RELATED APPLICATIONS

The present application claims priority to U.S. provisional patent application No. 63/282,668 filed 23 Nov. 2021, the disclosure of which is incorporated by reference herein.

FIELD OF THE INVENTION

The present invention relates to a thermochromic window, and more particularly, to an ultra-broadband thermochromic window which can regulate both solar transmittance (or reflectance) and thermal reflectance (or emittance) spectra simultaneously according to the temperature.

BACKGROUND

Buildings account for 30-40% of total energy consumption; approximately half of building energy is used for space heating and cooling. Windows are regarded as the least energy-efficient building elements due to their poor thermal insulation. Therefore, the creation of smart windows that dynamically adapt to variations of solar irradiance and weather conditions are essential for improving building energy efficiency.

To achieve optimal energy regulation, two types of radiative heat flux should be considered: solar radiation from the sun and thermal radiation from objects. An ideal smart window should possess high solar transmittance for external solar harvesting and low thermal emittance for internal heat insulation during cold seasons. In contrast, the window should have low solar transmittance for external solar blockage and high thermal emittance for internal heat dissipation during hot seasons. In particular, the thermal emittance regulation overwhelms the solar regulation in energy saving due to round-the-clock thermal energy exchange between indoor spaces and surrounding environments. The estimated energy savings from an ideal thermal control window are 2.5 and 9 times that of an ideal solar control window in summer and winter, respectively. Further, an optical switch between different states can be stimulated from thermo-, electro-, photo- or mechanically-based-responses. Among them, thermochromic windows having a spectrum regulation that varies according to the environmental temperature has the greatest potential for saving energy.

However, most of the currently-available thermochromic windows are only capable of regulating solar radiation. For example, vanadium dioxide ($VO_2$) and hydrogels are the two most widely investigated materials for thermochromic windows. $VO_2$ is infrared-transparent in its semiconducting state at low temperatures and is infrared-reflective in its metallic state at high temperatures, thus can act as a regulator to accomplish near-infrared (NIR) regulation, a part of solar radiation regulation, for thermochromic windows. Although coating $VO_2$ on glass can accomplish thermal emittance regulation in the long-wavelength infrared spectrum, this regulation is a negative regulation as the emittance is high in the cold state while low in the hot state, the opposite optical behavior of what is needed for energy savings. Coating $VO_2$ on metals can reverse the optical behavior to achieve positive regulation, but this makes the regulator opaque and not suitable for windows. Thus, only the MR regulation of $VO_2$ is commonly used for thermochromic windows.

Hydrogel is another promising material for smart windows. It has high solar transmittance in a cold state because of the index matching between the polymer and water in the hydrogel. Phase separation in a hot state generates strong internal scattering and leads to low solar transmittance. Since its spectrum modulation includes visible and NIR radiation, it has stronger solar regulation and consequently a larger potential for saving energy than $VO_2$. However, the phase separation mechanism can only shape the incident spectrum up to the near infrared region, so it cannot fulfill thermal radiation regulation across the entire incident spectrum.

Therefore, there is a need in the art for thermochromic windows that can regulate both solar and thermal radiation to provide enhanced energy efficiency of interior building environments. The present invention addresses this need.

SUMMARY OF THE INVENTION

The present invention provides a thermochromic window which has good spectral regulation for both solar and thermal radiation, functioning in all weather conditions as well as compensating for day and nighttime conditions.

The thermochromic window is an ultra-broadband thermochromic window (STR smart window) having excellent indoor temperature regulation. Synchronous modulation of both solar and thermal radiation is achieved through an absorber-metal mesh composite film. Liquid molecules are used as a thermal regulator and directional transfer between different sides of the metal mesh is controlled by a hydrophobic-hydrophilic transition of the absorber. The liquid movement provides thermal regulation, and the phase separation of the absorber conducts solar regulation simultaneously in different temperature states. Based on this new mechanism, the STR smart window can manipulate an ultra-broadband spectral regulation with excellent solar transmittance modulation of 54.8% and thermal reflectance (emittance) modulation of 57.1%. Further, its high luminance transmittance (78.3%) and low transition temperature ($\tau_c=31°$ C.) in a selected embodiment make it efficient and feasible in commercial applications.

The provision of both solar and thermal regulation creates indoor temperature adjustment for both hot and cold rooms. In cold rooms, the STR smart window has high solar transmittance ($T_{sol}=63.2\%$) for indoor solar heating in the daytime and high thermal reflectance ($R_{the}=1-\varepsilon=64.8\%$) for indoor heat insulation in both the daytime and nighttime. Conversely, for a hot room, the STR smart window has low solar transmittance ($T_{sol}=8.4\%$) for alleviating indoor solar heating in the daytime and low thermal reflectance ($R_{the}=1-\varepsilon=7.7\%$, or high thermal emission ($\varepsilon$)) for facilitating indoor heat dissipation in both the daytime and nighttime.

In one aspect, the present invention provides a solar and thermal regulating window structure. The structure includes an optically-transparent housing frame; a reversible liquid absorbent material layer positioned in the optically-transparent housing frame; a thermally-reflective layer having high solar transmittance and high thermal reflectance positioned over the reversible liquid absorbent material layer; a liquid, wherein below a selected transition temperature, the liquid is absorbed in the reversible liquid absorbent material layer and above the selected transition temperature, the liquid is positioned over the reversible liquid absorbent material layer, such that when ambient temperature is below the selected transition temperature, the window structure facilitates indoor solar heating through solar transmittance during daytime and facilitates indoor heat insulation through thermal reflectance during daytime and nighttime and when ambient temperature is above the selected transition temperature, the window structure facilitates indoor heat dissipation through thermal emission; wherein the selected transition temperature is in the range of approximately 20° C. to 50° C.; and an optical film with high transmittance for both solar and thermal radiation, configured to seal the reversible liquid absorbent material layer, liquid, and thermally-reflective layer in the optically-transparent housing frame.

In a further aspect, the reversible liquid absorbent material is a hydrogel.

In a further aspect, the hydrogel is poly(N-isopropylacrylamide).

In a further aspect, the liquid absorbed in the reversible liquid absorbent material layer is water.

In a further aspect, the thermally-reflective layer is a metal mesh.

In a further aspect, the metal mesh is a silver nanowire mesh.

In a further aspect, the optical film is a polyethylene film.

In a further aspect, the reversible liquid absorbent material layer is bonded to the optically-transparent housing frame.

In a further aspect, the window structure has a solar transmittance of at least approximately 50 percent for indoor solar heating in the daytime a thermal reflectance of at least approximately 50 percent for indoor heat insulation in both daytime and nighttime in cold weather.

In a further aspect, the window structure has a solar transmittance of less than approximately 50 percent for alleviating indoor solar heating and a thermal reflectance of less than approximately 30 percent for facilitating indoor heat dissipation in hot weather.

In a further aspect, the selected transition temperature is 31° C.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figures 1A, 1B, 1C, 1D:
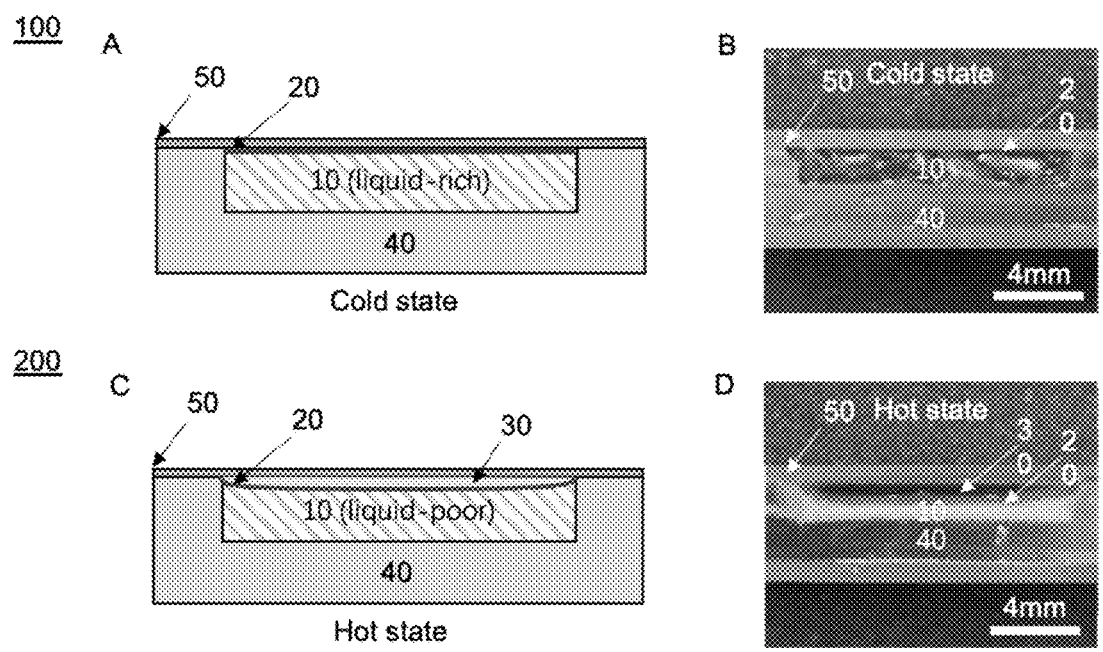
FIGS. 1A-1D show the schematic structure of the STR window in cold state (1A) and hot state (1C). The corresponding photographs of two states are shown in 1B and 1D.

The following detailed illustrations and specifications are to aim to explain claims in the current invention. These embodiments are described in sufficient detail to enable those skills in the art to practice the invention. Other embodiments may be utilized, and structural and material changes may be made without departing from the scope of the invention. The various embodiments are not necessarily mutually exclusive, as some embodiments can be combined with one or more other embodiments to form new embodiments.

The present invention provides a thermochromic window that provides regulation of solar transmittance and thermal transmittance to harvest and retain solar energy during cold seasons while reflecting solar energy and dissipating indoor heat during hot seasons. As used herein, the term "solar transmittance" relates to the ratio of the amount of total solar energy in the full solar wavelength range (300-2,500 nanometers) that is allowed to pass through a glazing system to the amount of total solar energy falling on that glazing system. "Thermal transmittance" is the rate of transfer of heat through matter and defines the ability of an element of structure to transmit heat under steady-state conditions. It is a measure of the quantity of heat that will flow through unit area in unit time per unit difference in temperature of the individual environments between which the structure intervenes. Thermal emittance characterizes the capability, of a surface to reemit previously-absorbed heat away from itself.

Turning to the drawings in detail, FIGS. 1A-1D schematically depicts a panel that can be attached to glass, performing as a window for enclosed spaces to separate indoor and outdoor environments. This panel can perform different functions in a cold state (100-FIG. 1A, 1B) and a hot state (200-FIG. 1C, 1D).

The panel 100 includes an absorbent layer 10 that absorbs and desorbs a liquid (e.g., water) and is housed in a solar-transparent frame 40. A thermal-reflective layer 20 is positioned on the absorbent layer 10 while an optical film 50 seals the panel.

As seen in FIGS. 1A-1B, in a cold state, the liquid is absorbed by the absorbent layer 10, creating a liquid-rich state. The thermal-reflective layer 20 is in an unbent state, grafted to the absorbent layer 10 bonded to the solar-transparent frame 40.

As seen in FIGS. 1C-1D, in a hot state, the absorbent layer 10 shrinks as the absorbed liquid 30 covers the thermal-reflective layer 20. The frame 40 functions as a fixed boundary to limit the shrinkage direction of the absorbent layer 10. The optical film 50 is radiation-transparent and watertight, thus it maintains the optical performance and the structural stability of the panel.

Figures 2A, 2B:
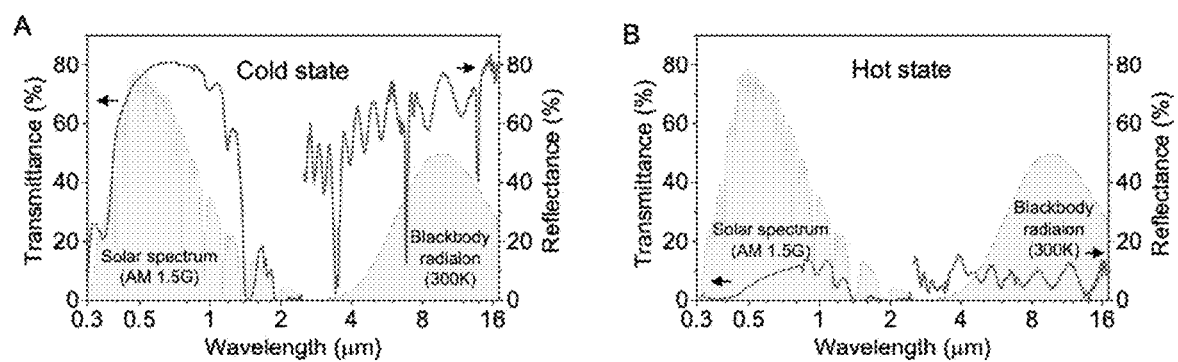
FIGS. 2A-2B show the spectra of the STR window in cold state (2A) and hot state (2B).

In the thermochromic panel, liquid is used as a thermal regulator. When the liquid is absorbed by the absorbent layer 10 in the cold state, the thermal-reflective layer 20 is uncovered and contributes to a strong thermal reflectance on the surface. At the same time, the water-rich absorbent layer 10 reaches an index-matching state and exhibits high solar transmittance. Thus, the whole structure 100 has high solar transmittance and strong thermal reflectance in cold state (FIG. 2A). In hot state of FIGS. 1C-1D, internal phase separation occurs, and the liquid is desorbed and forms a liquid layer 30 above the thermal-reflective layer 20. Since this liquid is thermal-absorptive, the original thermal reflection drops significantly on the top surface. Also, the index-matching state ceases to exist and the density distribution become uneven in the absorbent layer 10; this leads to strong solar scattering and dramatically increases the solar reflectance. As a result, the panel exhibits low solar transmittance and low thermal reflectance in a hot state (FIG. 2B). Thus, the present invention provides temperature-responsive solar and thermal regulation in a single panel. This panel can be attached to ordinary glass, creating a solar and thermal regulating (STR) window.

Exemplary materials for the STR smart window include a poly(N-isopropylacrylamide) (pNIPAm) hydrogel film 10 grafted to a polydimethylsiloxane (PDMS) frame 40 and a solar-transparent but thermal-reflective silver-nanowire (AgNW) mesh 20 on the hydrogel film. When the temperature rises above the transition temperature, the pNIPAm undergoes a temperature-triggered phase separation and switches from being solar transparent to opaque, providing solar modulation through the internal scattering. Simultaneously, because of the phase transition induced hydrophilic-to-hydrophobic conversion of the pNIPAm network, water molecules within the pNIPAm network are pumped out and cover the AgNW mesh. As water can strongly emit infrared radiation, the composite film switches from being thermally reflective to emissive and enables thermal modulation.

In order for the window to be applicable for use in a wide variety of climates, the transition temperature of the absorbent layer 10 is tunable across a broad temperature range; this ensures that the transition between liquid-absorbing and non-liquid-absorbing corresponds to the climate's need for heat retention or heat reflection. In particular, the transition temperature is tunable through appropriate material selection/custom design between approximately 20-50° C. In a particular embodiment set forth in the Example, the transition temperature was selected to be 31° C.

Figures 9A, 9B, 9C, 9D, 9E:
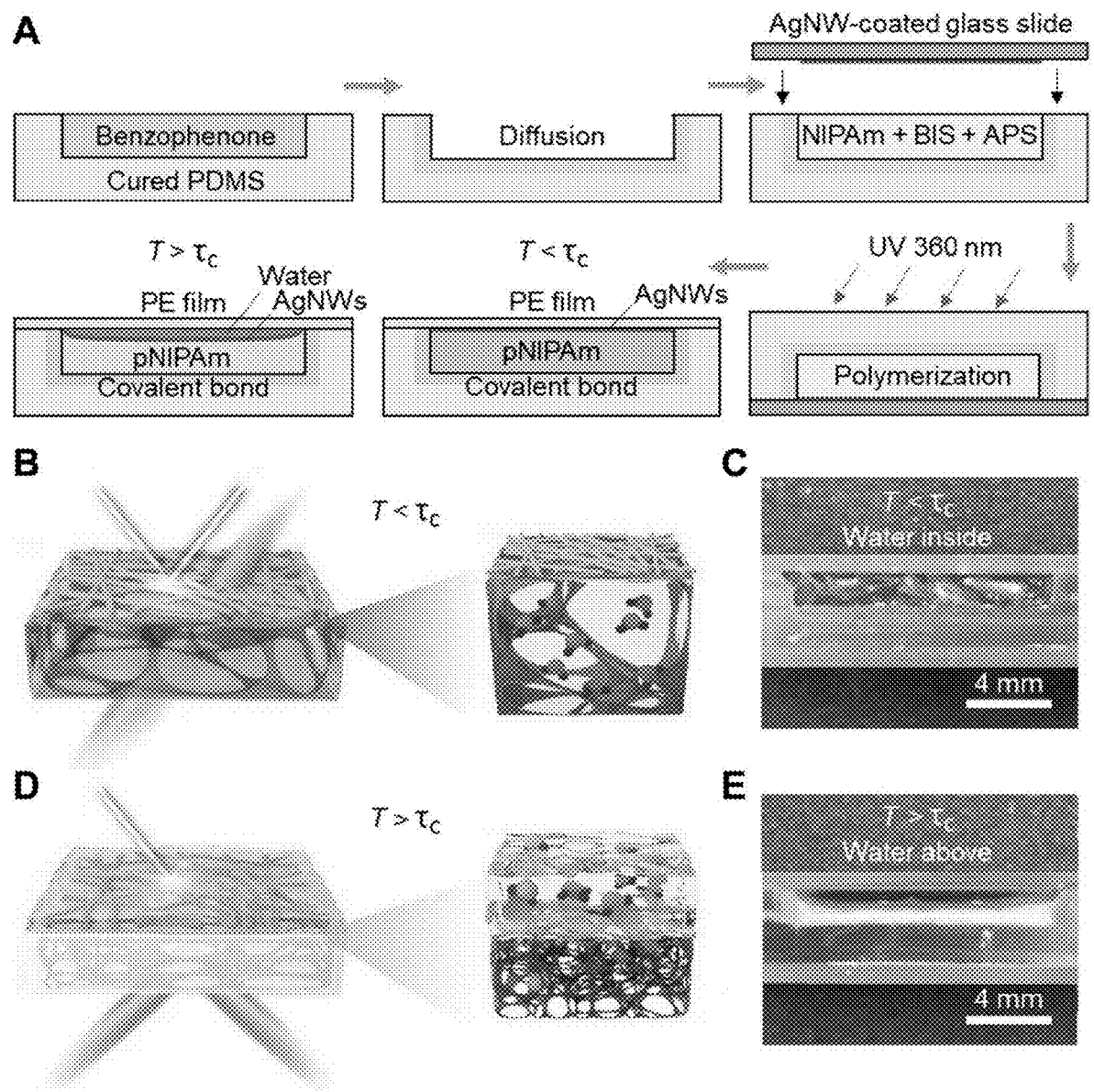
FIG. 9A shows a fabrication process flow of an STR window.
FIG. 9B the schematic of the working mechanism in the cold condition.
FIG. 9C an image of the cross-sectional blue-dyed water distribution in the cold condition.
FIG. 9D is a schematic of the working mechanism in a hot condition.
FIG. 9E is an image of the cross-sectional blue-dyed water distribution in a hot condition.

The fabrication process of the STR smart window is illustrated in FIG. 9A. A PDMS tray was first cured and followed by pouring benzophenone solution [20 weight % (wt %) in acetone] into the tray. The benzophenone solution diffused into the PDMS network and facilitated the chemical bonds between PDMS and pNIPAm. The pNIPAm film was synthesized from a mixed solution of N-isopropylacryamide (NIPAm), N,N'-methylenebis(acrylamide) (BIS), and ammonium persulfate (APS) initiator by free-radical polymerization within the PDMS tray, which was subsequently sealed by an AgNW-coated glass slide and stored in an ice-water bath. The polymerization lasted for 4 hours in an ultraviolet (UV) reactor with 340-nm UV light exposure and then 8 hours with UV light off. After polymerization, the pNIPAm hydrogel network was formed and grafted on the PDMS tray. This immobilized pNIPAm maintains the same transition temperature as the original pNIPAm, because the free radicals do not affect the hydrophobic and hydrophilic interaction between pNIPAm polymer chains and water molecules. Since NIPAm has stronger hydrophilic bonds than glass and the hydrophilic AgNWs are immersed in NIPAm solution, the AgNW mesh is easily transferred and embedded on the hydrogel top surface during the polymerization process. Last, after removing the glass slide, we enclosed the PDMS tray with a visible and infrared transparent polyethylene (PE) film, which can be replaced by a variety of broadband-transparent optical sheets.

At low ambient temperature (T<τc), the pNIPAm cross-linked networks swell in water through intermolecular hydrophilic bonds (hydrogen bonds), and water molecules evenly disperse within the pNIPAm network (illustrated by the well-dispersed blued dyed water in FIG. 9C). The refractive index of the water-rich polymer is close to that of water and thereby the hydrogel film is solar-transparent. The AgNW mesh deposited on top of the hydrogel film has high solar transmittance and high thermal reflectance. After integrating the hydrogel and AgNW mesh, the STR window exhibits high solar transmittance and thermal reflectance (low emissivity) (FIG. 9B) at low temperatures. When the temperature increases and exceeds the phase transition temperature (T>τc), hydrogen bonds are weakened, and the water/pNIPAm connecting structures are destroyed, triggering the hydrophobic associations and squeezing out water molecules. Since five sides of the pNIPAm network are chemically bonded with the PDMS tray, only the remaining free side of pNIPAm can shrink, resulting in directional water transportation and accumulation on top of the AgNW mesh (illustrated by the blue-dyed water accumulation on the free side in FIG. 9E). The phase separation and shrinkage of the pNIPAm network lead to polymer-rich and polymer-poor microphases, which generate light-scattering centers, turn the hydrogel to white, and efficiently reflect the sunlight. Moreover, the newly formed water layer has high thermal emissivity when its thickness is larger than 0.1 mm and thereby suppresses the thermal reflection of the underlying AgNW mesh, providing notable thermal modulations (FIG. 9D). This STR smart window design realizes an excellent thermochromic function with synchronous modulation of solar and thermal radiation. Note that antifreezing capability can be added by mixing antifreezes to lower the freezing point and maintain the performance in cold regions. Water evaporation can be minimized by mixing a high-boiling solvent with water to reduce the evaporation rate or using a cover with low water vapor permeability to preserve water in the hydrogel. The potential water leakage and uneven distribution in large panels can be prevented by using rigid optical films and gridding encapsulation. Other transparent polymers can also be used as the substitutes for the PDMS frame. This polymer frame-core design contributes to not only the directional movement of water but also the realization of an adhesive substrate on glass, which may easily fit to existing windows.

Figures 3A, 3B:
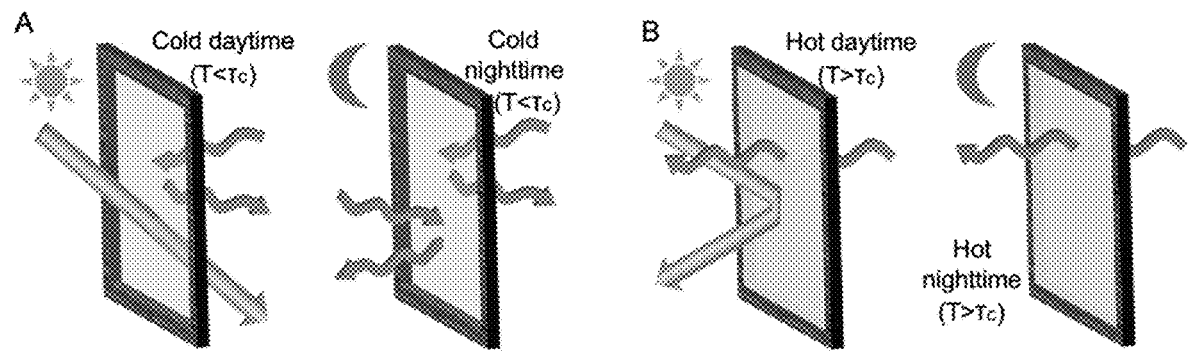
FIGS. 3A-3B show the solar and thermal radiation path of the STR window in the cold state (3A) and hot state (3B).

The optical performance of STR window is shown in FIG. 3. In the cold state, solar radiation can pass through and heat up the inner space. While the thermal radiation is reflective for heat insulating purpose. Thus, the inner space can be warmed up efficiently. In hot state, solar radiation is reflected to avoid solar heating. While the inner thermal radiation is absorbed and emitted out, which leads to heat dissipation and the inner space can be cooled down. Different from the reported thermochromic windows, it works not only in daytime, but also in nighttime.

EXAMPLE

Figures 4A, 4B:
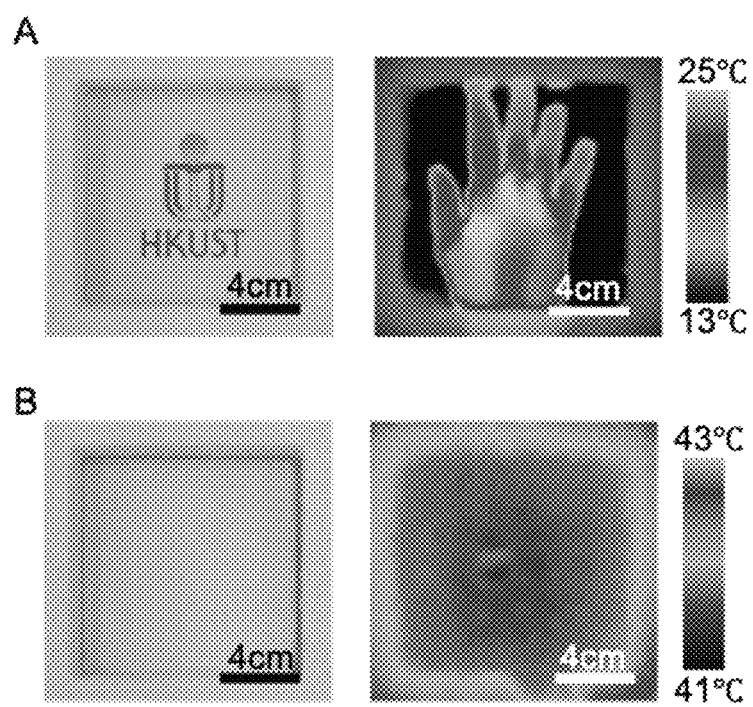
FIGS. 4A-4B show the visible and infrared photographs of the STR window in cold state (4A) and hot state (4B).

A 10×10 cm STR window was fabricated, and its ultra-broadband optical transformation was demonstrated by the visible and infrared images in the cold state (FIG. 4A) and hot state (FIG. 4B). A colorful logo (HKUST) could be seen clearly through the window in the cold state (FIG. 4A, left) while completely blocked in the hot state (FIG. 4B, left). Thermal radiation from a hand was reflected by the window in the cold state (FIG. 4A, right) and absorbed in the hot state (FIG. 4B, right).

Figures 5A, 5B, 5C:
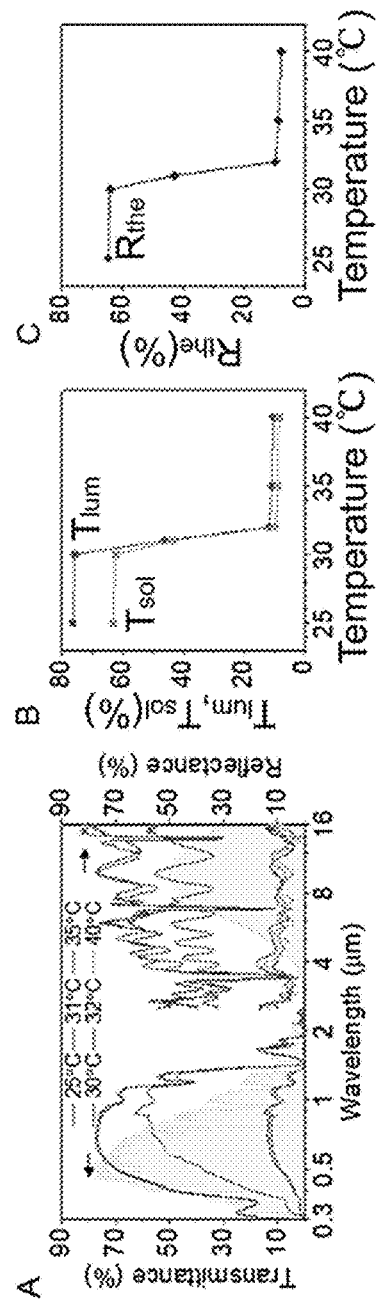
FIGS. 5A-5C show the spectra (5A), luminance transmittance and solar transmittance (5B), and thermal reflectance (5C) of the STR windows at different temperatures.

The thermochromic property of the STR window was measured by spectrometer at different temperatures. The solar transmittance and thermal reflectance are high when the hydrogel temperature is below the transition temperature ($\tau_c$) of 31° C., while drop to low values after phase transition occurs (FIG. 5A), resulting in solar and thermal modulation larger than 55% (FIGS. 5B and C).

Figures 6A, 6B:
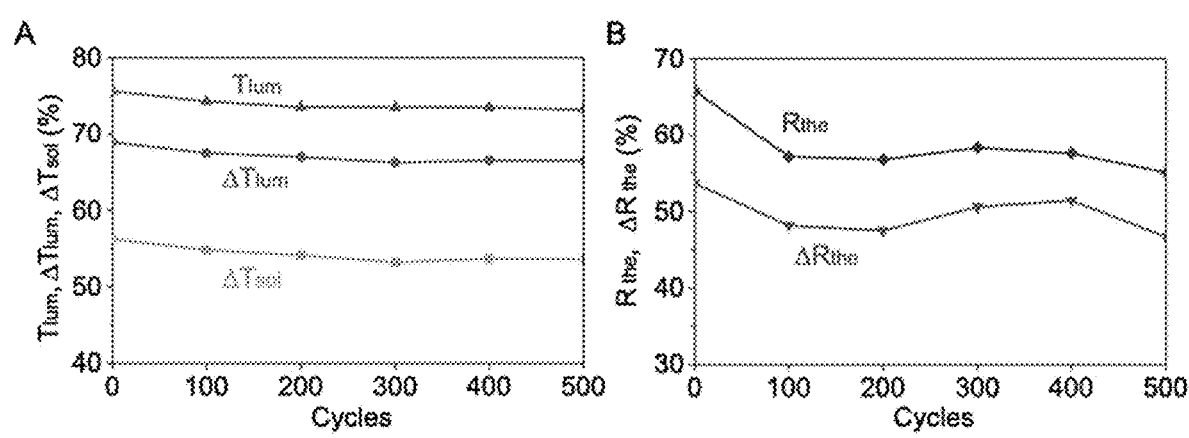
FIGS. 6A-6B show the variation of luminance and solar performance (6A) and thermal performance (6B) of the STR window with the heating-cooling cycles.

The long-term durability of the STR window was investigated through heating-cooling tests of over 500 cycles. The spectra of the window were measured every 100 cycles. The $T_{lum}$, $\Delta T_{lum}$, and $\Delta T_{sol}$ showed less than 5% decrease after 500 cycles (FIG. 6A). The variations of the $R_{the}$ and $\Delta R_{the}$ were maintained within 10% (FIG. 6B).

The indoor temperature management capacities were measured by separately installing four different windows (i.e., a glass window, Low-E window, hydrogel and STR window with dimensions of 100 mm×100 mm×6 mm) onto an enclosed chamber with dimensions of 12 cm×12 cm×15 cm and monitoring the indoor temperature history in different environmental conditions. The optical and thermal properties of the four windows are listed in Table S1. The low-E window is widely used for energy saving in buildings and vehicles as it can selectively transmit visible light and reflect near-infrared light. The hydrogel window attracts enormous interest because of its excellent solar modulation.

Figures 7A, 7B, 7C, 7D, 7E:
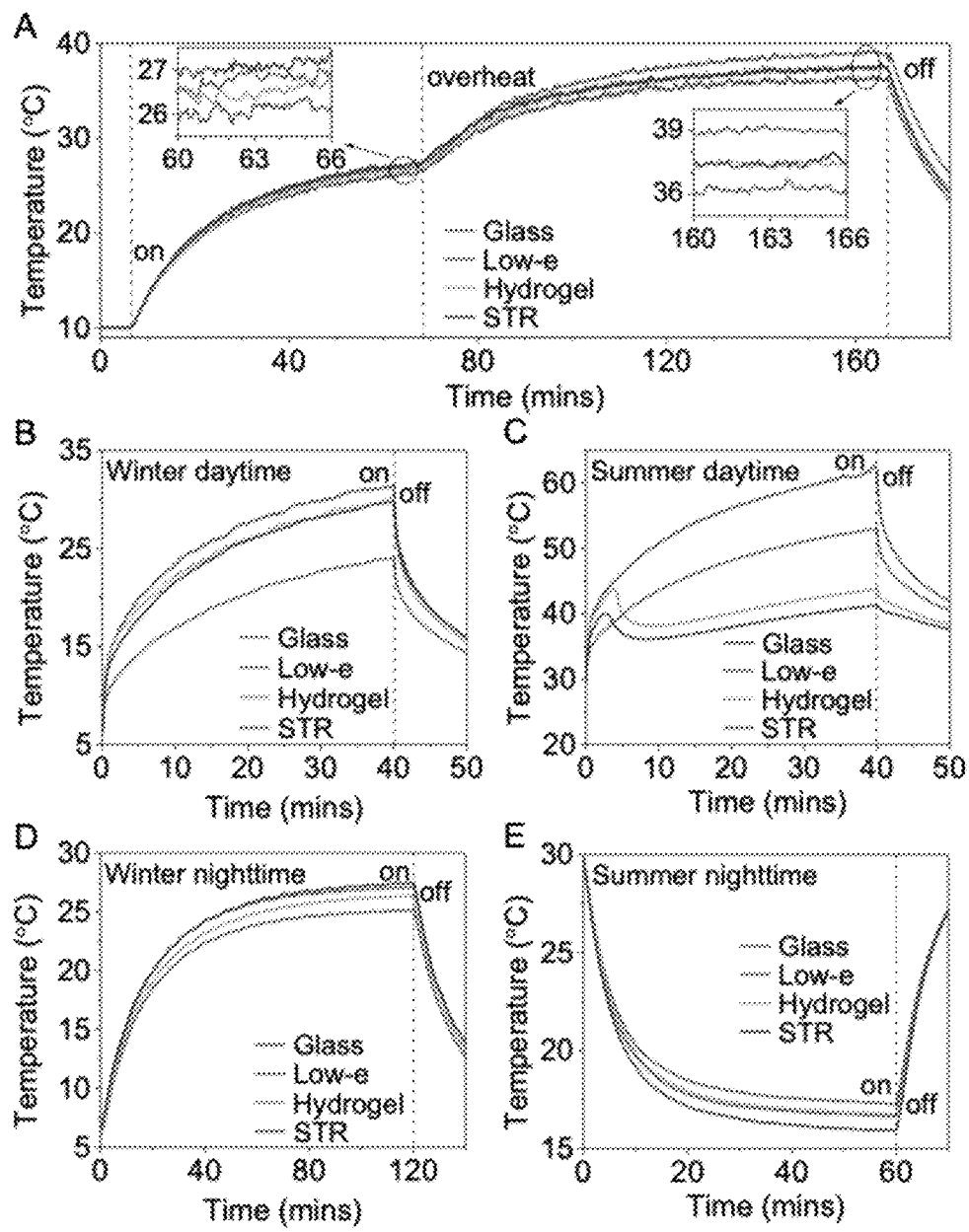
FIGS. 7A-7E shows the indoor temperature regulation in the heating condition (7A), winter daytime condition (7B) summer daytime condition (7C), winter nighttime condition (7D) and summer nighttime condition (7E) by different windows, including normal glass, low-E, hydrogel and STR windows.

The thermal-responsive behaviors of the tested windows were measured by monitoring the indoor temperature vs. time curves. A chamber with an initial temperature of 10° C. was heated by an internal heater (heating power=3 W) and its temperature was monitored (FIG. 7A). At the initial stage, the SRT window was in the cold state and possessed high thermal reflectance, providing the highest heat insulation capacity. Specifically, the SRT window performed better than the Low-E window due to the lower thermal conductivity of hydrogel than the glass. At the next stage, the heating power was increased to 5.2 W, and the chamber temperature continued rising over 31° C., triggering the hydrogel phase transition. Subsequently, the SRT window and hydrogel window switched to thermal-emissive state and showed comparable heat dissipation capacity. However, the Low-E window retained invariable high thermal reflectance and provided an overheating of 1.8° C. higher than the SRT window. The smart temperature responsive behaviors of our SRT window demonstrate the superiority of the adaptive thermal reflectance and emissivity in regulating indoor temperatures. This heat insulation and dissipation switching can be triggered by not only internal heat loads (e.g., humans, heat generators, or machines) but also external heat sources (e.g., sunlight) in applications.

A solar simulator was used and controlled the ambient temperature to simulate weather conditions in winter and summer daytime and quantified the window thermal management performance. In the winter daytime, the ambient temperature was set at 5° C., and the solar simulator (800 W/m$^2$) was turned on to light the chamber (FIG. 7B). Comparing with the hydrogel window, the STR window has higher thermal reflectance and provides better heat insulation capacity, which compensates its lower solar energy gain due to lower solar transmission. Consequently, the temperatures of the STR and hydrogel chambers reached 30° C. at 40 minutes, while the temperature of the Low-E chamber was 6° C. lower than that of the STR and hydrogel chambers due to its low solar transmission ($T_{sol}$=38.6%). In the summer daytime, the ambient temperature was set at 28° C., and the solar simulator power was 1000 W/m$^2$ (FIG. 7C). The temperatures of glass and Low-E chamber increased monotonically above 60 and 50° C., respectively. In contrast, the temperatures of the hydrogel and STR chambers showed an increase-decrease trend because the phase transition occurring at around 3-4 minutes impeded further solar heating, and eventually were maintained under 45° C. In particular, owing to faster phase transition and lower solar transmission of the STR window, the temperature of the STR chamber was approximately 3° C. cooler than that of the hydrogel chamber.

Besides the thermal management tests simulating the daytime, the temperature response was further measured under simulated nighttime situation. A heater was installed (silicone heating sheet) or a cooler (Peltier cooler) on the backside of the chambers to simulate the weather conditions in winter or summer nighttime, respectively. In the winter nighttime (ambient temperature is 6° C.), the temperature of the STR chamber reached 27.5° C. at 120 minutes, followed by the Low-E chamber of 27° C. (FIG. 7D). The temperatures of the hydrogel and glass chambers were 1.5° C. and 2.7° C. lower than that of the STR chamber, because of the high thermal emissivity and thereby, high heat dissipation from inside to outside. In the summer nighttime (ambient temperature is 30° C.), the temperature of the STR chamber achieved the lowest level owing to its excellent heat dissipation capacity, while the temperatures of the Low-e, hydrogel, and glass chambers were 1-2° C. higher (FIG. 7E). Overall, due to its adaptive and reversible switch from solar transparent to opaque, and thermal reflective (heat insulation) to emissive (heat dissipation), the STR window realizes smart and excellent indoor temperature regulations for all weather conditions, i.e., winter daytime and nighttime, and summer daytime and nighttime.

Realizing smart indoor temperature regulation without HVAC systems is preferred for achieving building carbon neutrality. The indoor temperature regulation capacity of the STR window was explored using EnergyPlus simulations. The weather data of Beijing was selected due to its large annual temperature variation (temperature is over 30° C. in summer and below −8° C. in winter). The energy consumption of a one-floor house (8×8×3 m) was obtained with four different windows. The temperature in four successive days in January and July in Beijing were plotted in FIGS. 8A and 8B. Due to the ultra-broadband spectral modulation and thereby excellent temperature regulation capacity, the STR window provided the highest temperature in January while maintaining the lowest temperature in July.

Figures 8A, 8B, 8C, 8D:
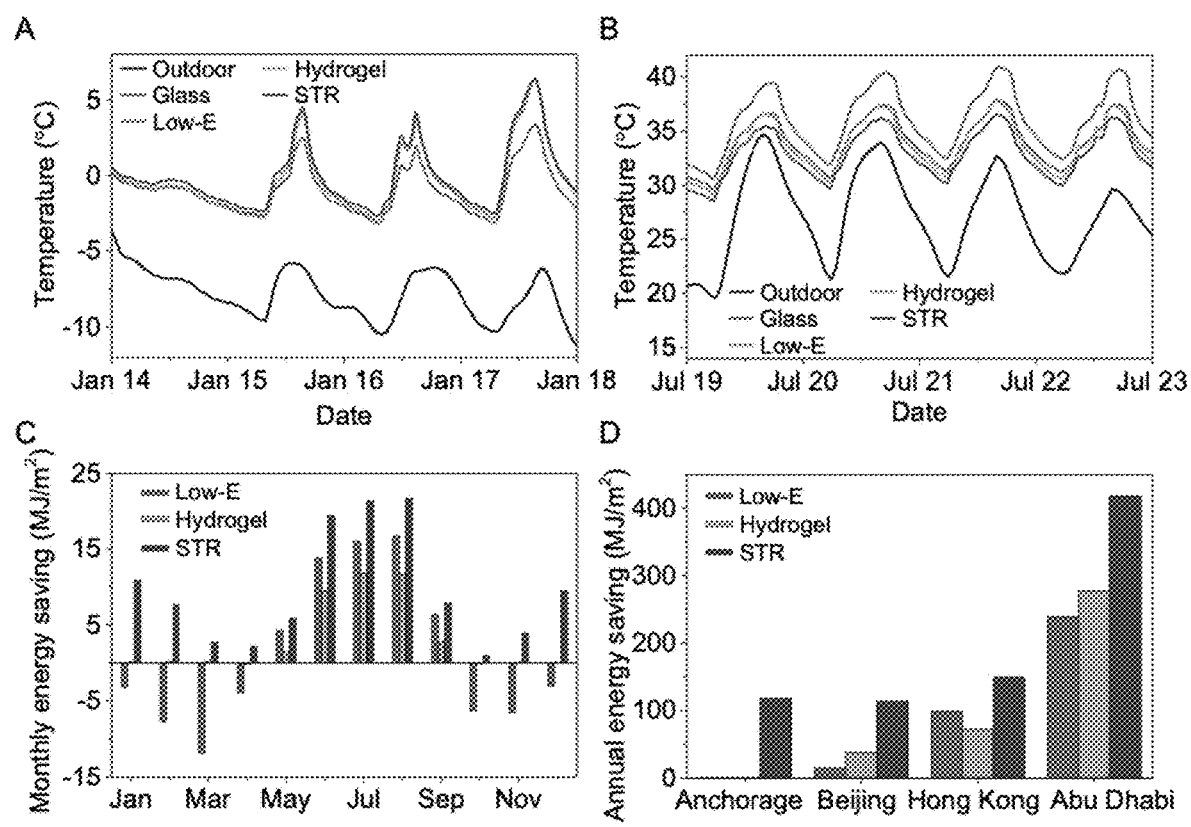
FIGS. 8A-8D show the simulative indoor temperature of a house in Beijing in January (8A) and July (8B) without HVAC system with usage of different windows. The monthly energy savings with different windows compared to the standard glass window in Beijing are shown in 8C. The annual energy savings with different windows compared to the standard glass window in four cities are shown in 8D.

Moreover, energy-saving calculations were performed with the indoor room controlled at 26° C. by an HVAC system, which is an economic temperature recommended by the U.S. DOE. Additional two windows (low-E and hydrogel windows) were compared with the STR window in terms of the monthly energy saving in Beijing (FIG. 8C). The Low-E window produced positive energy savings in hot seasons while negative energy savings (energy consumptions) in cold seasons. The hydrogel window saved energy in hot seasons and had no impact in cold seasons. However, the STR window achieved positive energy savings in all seasons, specifically in winter and summer. Quantitatively, the total energy saving from the STR window is 6.8 times and 2.1 times more than the Low-E and Hydrogel windows in Beijing, respectively. Annual energy savings were calculated for additional three cities: Anchorage, Hong Kong, and Abu Dhabi (FIG. 8D). Note that the STR window achieved remarkable energy savings in Anchorage, while Low-E and hydrogel windows provided near-zero energy savings because they lose function in cold weather. As the latitudes decrease from Beijing to Abu Dhabi, the three windows provided increasing annual energy savings, among which the STR window performed the best. Quantitatively, the STR window can save more than 100 MJ/m$^2$ in Anchorage, Beijing (double the Low-E window), and Hong Kong, and 400 MJ/m$^2$ in Abu Dhabi, showing its great energy-saving capacity for all weather conditions.

Adaptive control of solar transmission and thermal radiation through windows is pivotal for reducing building energy consumption. However, synchronous passive regulations of solar transmission and thermal radiation have yet to be integrated into one thermochromic smart window system. For the first time, we developed a solar and thermal-regulative thermochromic window (STR smart window) by integrating a thermochromic liquid-absorber, and metal mesh into absorber/metal composites for all-weather applications. We exploited a hitherto unexplored thermal emissivity regulation mechanism resulting from temperature-triggered liquid capture and release behavior originating from the absorber phase transition, which dynamically modulates solar transmission at the same time. The excellent solar modulation ($\Delta T_{sol}$=54.8%) and thermal modulation ($\Delta \varepsilon$=57.1%) of the STR window successfully regulate the indoor temperature in the daytime and the nighttime. Compared with commercial Low-E glass and hydrogel windows, the STR window demonstrated lower heat loss in cold rooms while higher heat dissipation in hot rooms. This first integration of thermochromic absorber and metal mesh may provide some insight into concurrent solar and thermal regulation.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A solar and thermal regulating window structure comprising:
   an optically-transparent housing frame;
   a reversible liquid absorbent material layer positioned in the optically-transparent housing frame, the reversible liquid absorbent material layer being capable of reversibly absorbing and releasing a liquid based on ambient temperature;
   a thermally-reflective layer positioned over the reversible liquid absorbent material layer, wherein the thermally-reflective layer is permeable metallic nanowire mesh having high solar transmittance and high thermal reflectance;
   a liquid, wherein below a selected transition temperature, the liquid is absorbed in the reversible liquid absorbent material layer and above the selected transition temperature, the liquid is positioned over the reversible liquid absorbent material layer and the thermally-reflective layer such that it blocks the thermally-reflective layer from reflecting indoor heat, such that when ambient temperature is below the selected transition temperature, the window structure facilitates indoor solar heating through solar transmittance during daytime and facilitates indoor heat insulation through thermal reflectance during daytime and nighttime and when ambient temperature is above the selected transition temperature, the window structure facilitates indoor heat dissipation through thermal emission; wherein the selected transition temperature is in the range of approximately 20° C. to 50° C.;
   an optical film with high transmittance for both solar and thermal radiation, wherein the optical film is bonded to the housing frame to seal the reversible liquid absorbent material layer, liquid, and thermally-reflective layer in the optically-transparent housing frame.

2. The solar and thermal regulating window structure of claim 1, wherein the reversible liquid absorbent material is a hydrogel.

3. The solar and thermal regulating window structure of claim 2, wherein the hydrogel is poly(N-isopropylacrylamide).

4. The solar and thermal regulating window structure of claim 1, wherein the liquid absorbed in the reversible liquid absorbent material layer is water.

5. The solar and thermal regulating window structure of claim 1, wherein the metallic nanowire mesh is a silver nanowire mesh.

6. The solar and thermal regulating window structure of claim 1, wherein the optical film is a polyethylene film.

7. The solar and thermal regulating window structure of claim 1, wherein the reversible liquid absorbent material layer is bonded to the optically-transparent housing frame.

8. The solar and thermal regulating window structure of claim 1, wherein the window structure has a solar transmittance of at least approximately 50 percent for indoor solar heating in the daytime and a thermal reflectance of at least approximately 50 percent for indoor heat insulation in both daytime and nighttime when an ambient temperature is below the selected transition temperature.

9. The solar and thermal regulating window structure of claim 1, wherein the window structure has a solar transmittance of less than approximately 50 percent for alleviating indoor solar heating and a thermal reflectance of less than approximately 30 percent for facilitating indoor heat dissipation when an ambient temperature is above the selected transition temperature.

10. The solar and thermal regulating window structure of claim 1, wherein the selected transition temperature is 31° C.

* * * * *